(12) United States Patent
Kanno

(10) Patent No.: US 7,490,850 B2
(45) Date of Patent: Feb. 17, 2009

(54) AIRBAG-RELEASING PORTION STRUCTURE, INNER CASE, AND AIRBAG APPARATUS

(75) Inventor: Yuki Kanno, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/048,455

(22) Filed: Mar. 14, 2008

(65) Prior Publication Data
US 2008/0238051 A1  Oct. 2, 2008

(30) Foreign Application Priority Data
Mar. 30, 2007  (JP)  ............................. 2007-090706

(51) Int. Cl.
*B60R 21/16* (2006.01)
(52) U.S. Cl. .................... 280/728.3; 280/732
(58) Field of Classification Search ............ 280/728.2, 280/728.3, 731, 732
See application file for complete search history.

(56) References Cited

U.S. PATENT DOCUMENTS

| | | | | |
|---|---|---|---|---|
| 6,076,851 | A * | 6/2000 | Davis et al. ............... | 280/728.2 |
| 6,595,543 | B2 * | 7/2003 | Desprez .................... | 280/728.3 |
| 6,742,804 | B2 * | 6/2004 | Suzuki et al. ............. | 280/728.3 |
| 7,093,849 | B2 * | 8/2006 | Nishijima et al. ........ | 280/728.3 |
| 7,178,825 | B2 * | 2/2007 | Fujii et al. ................ | 280/728.3 |
| 7,210,700 | B2 * | 5/2007 | Zagrodnicki et al. ..... | 280/728.3 |
| 2005/0269804 | A1 | 12/2005 | Yamada et al. | |

FOREIGN PATENT DOCUMENTS

| | | |
|---|---|---|
| JP | 2002-12116 | 1/2002 |
| JP | 2003-137055 | 5/2003 |
| JP | 2003-137057 | 5/2003 |
| JP | 2006-248073 | 9/2006 |

* cited by examiner

*Primary Examiner*—Toan C To
(74) *Attorney, Agent, or Firm*—Fitch, Even, Tabin & Flannery

(57) ABSTRACT

An airbag-releasing portion structure, an inner case, and an airbag apparatus are provided that are unsusceptible to a surrounding temperature, and capable of small-sizing for a hinge portion and smoothly releasing an airbag to a vehicle interior. In this form, an inner case is composed of an inner panel connected to an inside of the outer panel, and a side wall that forms a space for housing the retainer. The inner panel is composed of a supporting portion connected to the fixing portion of the outer panel, a flap portion welded to the door portion, and a hinge portion formed between the supporting portion and the flap portion. The hinge portion includes a top portion, a supporting portion side connecting portion for connecting the supporting portion and the top portion, and a flap side connecting portion for connecting the flap portion and the top portion. A thin-walled portion formed to have a smaller wall thickness than the other portion of the hinge portion is provided in the supporting portion side connecting portion.

19 Claims, 4 Drawing Sheets

AIRBAG-RELEASING PORTION STRUCTURE, INNER CASE, AND AIRBAG APPARATUS

FIELD OF THE INVENTION

The present invention relates to an airbag-releasing portion structure for an airbag mounted on a vehicle such as an automobile or the like, an inner case, and an airbag apparatus, and more specifically, it relates to an airbag-releasing portion structure capable of smoothly releasing an airbag to a vehicle interior when an airbag apparatus is operated, an inner case, and an airbag apparatus.

BACKGROUND OF THE INVENTION

In general, an airbag apparatus for restraining an occupant by expanding and extending an airbag to a vehicle interior in collision or the like is mounted on a vehicle such as an automobile or the like. In such airbag apparatuses, various types of airbag apparatuses such as an airbag apparatus for use in a driver's seat internally installed in a steering wheel, a passenger airbag apparatus internally installed in an instrument panel, a side airbag apparatus internally installed in a side surface portion of a vehicle or a seat, a curtain airbag apparatus internally installed in an upper portion of a door, and so forth are developed and adopted. These airbag apparatuses are housed in a vehicle structure at a normal time such that the existence thereof cannot be recognized, and in an emergency such as a collision of the vehicle or the like, the airbag apparatuses are configured to expand and extend an airbag upon bursting through the vehicle structure. Hence, an airbag releasing portion of the airbag apparatus has to be configured to be able to smoothly and rapidly release the airbag in an emergency, whereas the same has to be configured to be covered so as to be assimilated to a vehicle interior component at a normal time.

Currently, FIGS. 4(A) and 4(B) are views illustrating a passenger airbag apparatus in which FIG. 4(A) is a cross-sectional view and FIG. 4(B) is an enlarged view of B-portion in FIG. 4(A). The passenger airbag apparatus is internally installed at a vehicle body side of an instrument panel 41 disposed at a front face of a passenger seat. Further, as illustrated in FIG. 4(A), the passenger airbag apparatus is provided with an airbag (not shown) that is folded back in the normal time and is expanded and extended in the emergency, an inflator 42 for supplying a gas into the airbag, a retainer 43 for housing the airbag and the inflator 42, an outer panel 44 mounted in the instrument panel 41, and an inner case 45 that is connected to an inside of the outer panel 44 and that latches the retainer 43. Incidentally, the retainer 43 is coupled with a fixing member 47 via a joining member 46 and fixed thereto.

In the aforementioned instrument panel 41, an opening portion 41a is formed so as to be able to release the airbag. In the opening portion 41a, the outer panel 44 is mounted using a clip 44a or the like and the surface thereof is processed so as to be assimilated to the instrument panel 41. Further, in an inside of the outer panel 44, a plurality of notches 44b for allowing the outer panel 44 to easily crack at a time when the airbag is expanded is formed. By means of the notches 44b, the outer panel 44 is sectionalized into a fixing portion 44c and a door portion 44d.

The aforementioned inner case 45 is composed of an inner panel 45a connected to an inside of the outer panel 44, and side walls 45b that form a space for housing the retainer 43. In addition, a plurality of latching holes 45c is formed in the side walls 45b, and hooks 43a connected to the retainer 43 are configured to be latched with the latching holes 45c. Further, the inner panel 45a is divided into two parts at a center portion and each of the inner panels 45a is composed of a supporting portion 451 connected to the fixing portion 44c of the outer panel 44, a flap portion 452 connected to the door portion 44d, and a hinge portion 453 formed between the supporting portion 451 and the flap portion 452. The hinge portion 453 is substantially U-shaped as illustrated in FIG. 4(B), and normally, thicknesses of t1 through t4 are uniformly formed.

In the above-described passenger airbag apparatus, the gas is supplied into the airbag (not shown) by operating the inflator 42 in an emergency such as a collision of the vehicle or the like. The airbag is expanded in the retainer 3 and the inner case 45, and presses the inner panel 45a and the outer panel 44. The outer panel 44 is divided at the notch 44b between the door portions 44d and releases the airbag to the vehicle interior. As an expanding and extending operation of the airbag proceeds, the door portion 44d of the outer panel 44 is rotated toward an instrument panel 41 side, and is further divided at the notch 44b between the fixing portion 44c and the door portion 44d. Currently, since the fixing portion 44c and the door portion 44d of the outer panel 44 are respectively connected to the inner panels 45a, there is no possibility that the door portion 44d is broken up even when the outer panel 44 is divided at the notch 44b. Further, the door portions 44d are further rotated toward the instrument panel 41 side and are opened in a double door-like manner by means of the operation of a hinge portion 48 of the inner panel 45a.

Here, the inner case 45 is formed of resin in general, and is susceptible to a surrounding temperature and is hardened or softened. Accordingly, a devisal is necessary for forming a shape of the hinge portion 453 so as to appropriately open the outer panel 44 in the double door-like manner. For example, a hinge portion described in Japanese Unexamined Patent Application Publication No. 2006-96267, is formed so as to expand out in a direction being spaced apart from an outer panel, and to be gradually thin-walled from a fixing portion side to a door-reinforcing portion side (refer to FIG. 4 in Japanese Unexamined Patent Application Publication No. 2006-96267). Further, a hinge portion described in PCT Japanese Translation Patent Publication No. 2003-137057, is formed such that a top of a bent portion has a thinner wall than the other portion of a curved hinge portion (refer to FIG. 4 in PCT Japanese Translation Patent Publication No. 2003-137057).

However, since the fixing portion side is formed to be entirely thick in the hinge portion described in Japanese Unexamined Patent Application Publication No. 2006-96267, a stretching up amount of the hinge portion at a time of opening the outer panel in the double door-like manner is small. Therefore, the lack of the stretching up amount has to be compensated by largely forming an entire hinge portion (namely, a diameter of a U-shaped portion). However, if the diameter of the U-shaped portion is enlarged, a non-welded portion between the outer panel and an inner panel increases, and an effect for reinforcing the outer panel is reduced. Furthermore, in the case that the U-shape is longitudinally formed so as to avoid such problems, a problem occurs in which a manufacture for the hinge portion becomes difficult and it becomes a factor of cost up.

Moreover, in a hinge structure described in PCT Japanese Translation Patent Publication No. 2003-137057, a portion (a top of a bent portion) that is easiest to be stretched at a time when the outer panel is opened in the double door-like manner is formed of a thin wall. Hence, a problem occurs in which an excessive stress is concentrated on the top of the bent portion.

SUMMARY OF THE INVENTION

The present invention is that originated in consideration of the above-described problems and the object is to provide an airbag-releasing portion structure, an inner case, and an airbag apparatus that are unsusceptible to a surrounding temperature, and capable of small-sizing for a hinge portion and smoothly releasing an airbag to a vehicle interior.

According to the present invention, an airbag-releasing portion structure characterized in including an opening portion for use in releasing an airbag, formed in a vehicle structure, an outer panel covering the opening portion, and an inner panel connected to an inside of the outer panel, in which the aforementioned outer panel includes a door portion for opening the aforementioned opening portion when the airbag is expanded, and a fixing portion connected to the aforementioned vehicle structure, in which the aforementioned inner panel includes a flap portion connected to the aforementioned door portion, a supporting portion connected to the aforementioned fixing portion, and a hinge portion that is substantially U-shaped, formed between the aforementioned flap portion and the aforementioned supporting portion, and in which in the aforementioned hinge portion, a low rigidity portion having lower rigidity than the other portion of the aforementioned hinge portion is formed between a top portion of the hinge portion and the aforementioned supporting portion, is provided. Further, in the aforementioned hinge portion, a low rigidity portion having lower rigidity than the other portion of the aforementioned hinge portion may be formed between the aforementioned top portion and the aforementioned flap portion. Furthermore, it is preferable that the low rigidity portion is a thin-walled portion formed to have a smaller wall thickness than the other portion in the aforementioned hinge portion. Moreover, it is preferable that the aforementioned thin-walled portion is smoothly connected to adjoining thick-walled portions.

Further, according to the present invention, an inner case characterized in being connected to an inside of an outer panel covering an opening portion for releasing an airbag formed in a vehicle structure, and housed in the aforementioned opening portion, in which the aforementioned outer panel includes a door portion for opening the aforementioned opening portion when the airbag is expanded, and a fixing portion connected to the aforementioned vehicle structure, in which the aforementioned inner case includes an inner panel connected to the aforementioned outer panel, and a side wall forming a space for housing a retainer where the airbag is housed, in which the aforementioned inner panel includes a flap portion connected to the aforementioned door portion, a supporting portion connected to the aforementioned fixing portion, and a hinge portion that is substantially U-shaped, formed between the aforementioned flap portion and the aforementioned supporting portion, and in which in the aforementioned hinge portion, a low rigidity portion having lower rigidity than the other portion of the hinge portion is formed between a top portion of the hinge portion and the aforementioned supporting portion, is provided. Furthermore, in the aforementioned hinge portion, a low rigidity portion having lower rigidity than the other portion of the aforementioned hinge portion may be formed between the aforementioned top portion and the aforementioned flap portion. Moreover, it is preferable that the aforementioned low rigidity portion is a thin-walled portion formed to have a smaller wall thickness than the other portion of the aforementioned hinge portion. Further, it is preferable that the aforementioned thin-walled portion is smoothly connected to adjoining thick-walled portions.

Furthermore, according to the present invention, an airbag apparatus characterized in including an airbag that is in a folded state during a normal time and expanded and extended in an emergency, an inflator for supplying a gas into the airbag, a retainer at least housing the airbag, an outer panel covering an opening portion for use in releasing the airbag, formed in a vehicle structure, and an inner case connected to an inside of the outer panel and latching the retainer, in which the aforementioned outer panel includes a door portion for opening the aforementioned opening portion when the airbag is expanded, and a fixing portion connected to the aforementioned vehicle structure, in which the aforementioned inner case includes an inner panel connected to the aforementioned outer panel, and a side wall forming a space for housing the retainer where the airbag is housed, in which the aforementioned inner panel includes a flap portion connected to the aforementioned door portion, a supporting portion connected to the aforementioned fixing portion, and a hinge portion that is substantially U-shaped formed between the aforementioned flap portion and the aforementioned supporting portion, and in which in the aforementioned hinge portion, a low rigidity portion having lower rigidity than the other portion of the aforementioned hinge portion is formed between the top portion of the hinge portion and the aforementioned supporting portion, is provided. Moreover, in the aforementioned hinge portion, a low rigidity portion having lower rigidity than the other portion of the aforementioned hinge portion may be formed between the aforementioned top portion and the aforementioned flap portion. Further, it is preferable that the aforementioned low rigidity portion is a thin-walled portion formed to have a smaller wall thickness than the other portion of the aforementioned hinge portion. Furthermore, it is preferable that the aforementioned thin-walled portion is smoothly connected to adjoining thick-walled portions.

According to an airbag-releasing portion structure, an inner case, and an airbag apparatus of the above-described present invention, a low rigidity portion can be caused to operate as a starting point when a door portion of an outer panel is rotated, while retaining the rigidity of a supporting portion and a top portion requiring the rigidity as a hinge portion by forming a low rigidity portion between the top portion and the supporting portion of the hinge portion. This enables the low rigidity portion to be unsusceptible to a surrounding temperature, and the hinge portion to be small-sized. Hence, the airbag can smoothly be released to a vehicle interior.

Further, when the low rigidity portion is formed between the top portion and the flap portion of the hinge portion, the number of the starting points when the door portion of the outer panel is rotated can be increased. This enables the low rigidity portion to be further unsusceptible to a surrounding temperature, and the hinge portion to be small-sized.

Furthermore, the low rigidity portion can be formed with ease and at a low cost by forming the aforementioned low rigidity portion to be a thin-walled portion having a smaller wall thickness than the other portion of the hinge portion. Moreover, a stress concentration occurring at the hinge portion can be eased by smoothly connecting the thin-walled portion to adjoining thick-walled portions.

BRIEF DESCRIPTION OF THE DRAWINGS

FIGS. 1(A) and 1(B) are views illustrating a passenger airbag apparatus in which FIG. 1(A) is a cross-sectional view, and FIG. 1(B) is an enlarged view of B portion in FIG. 1(A).

FIGS. 2(A)-2(D) are views illustrating an operation of the passenger airbag apparatus illustrated in FIG. 1 when an airbag is expanded, in which FIG. 2(A) illustrates an initial phase of expansion of the airbag, FIG. 2(B) illustrates a dividing phase of an outer panel, FIG. 2(C) illustrates a rotating phase of a door portion, and FIG. 2(D) illustrates a rotation completion phase of the door portion.

FIGS. 3(A)-3(D) are views illustrating other embodiments of a hinge portion, in which FIG. 3(A) illustrates a second embodiment, FIG. 3(B) illustrates a third embodiment, FIG. 3(C) illustrates a fourth embodiment, and FIG. 3(D) illustrates a fifth embodiment.

FIGS. 4(A) and 4(B) are views illustrating the passenger airbag apparatus, in which FIG. 4(A) is a cross-sectional view, and FIG. 4(B) is an enlarged view of B portion in FIG. 4(A).

DETAILED DESCRIPTION OF THE PREFERRED EMBODIMENTS

Figure 1:
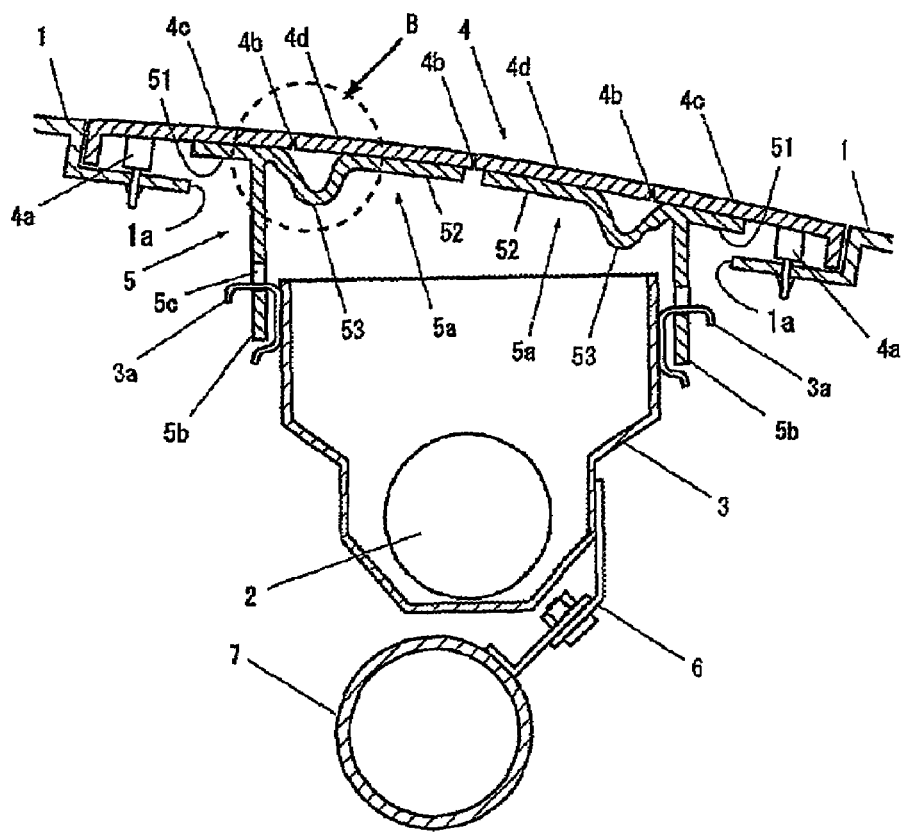
Figure 1:
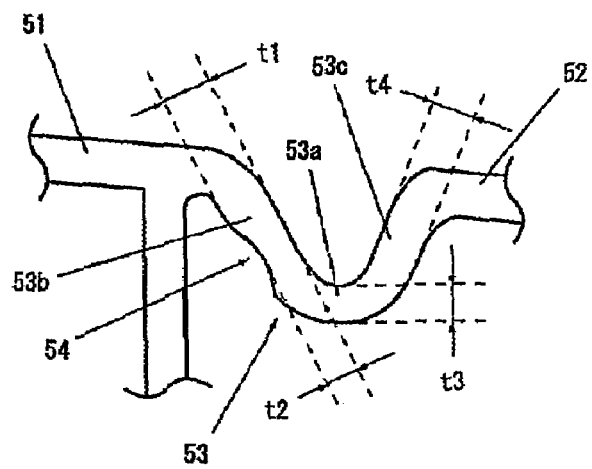
Figure 2:
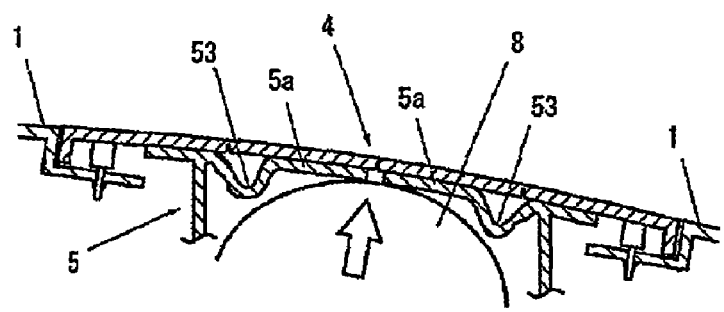
Figure 2:
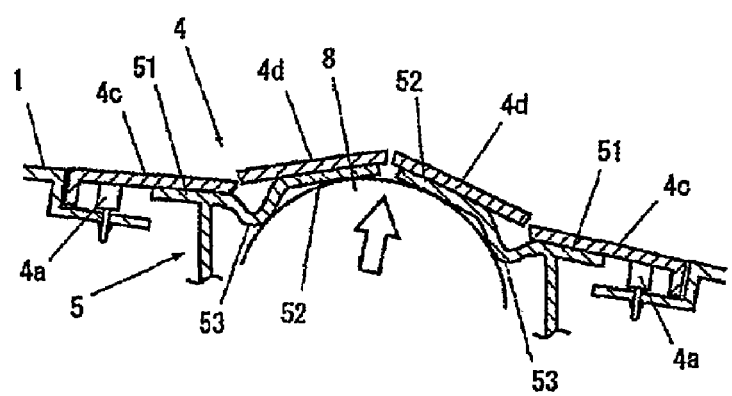
Figure 2:
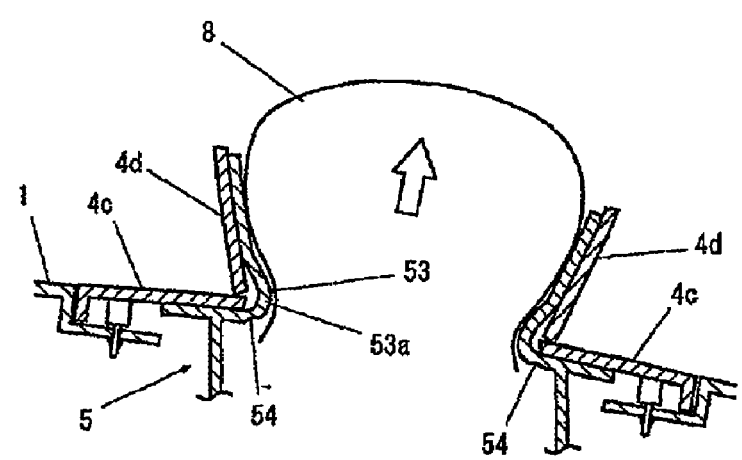
Figure 2:
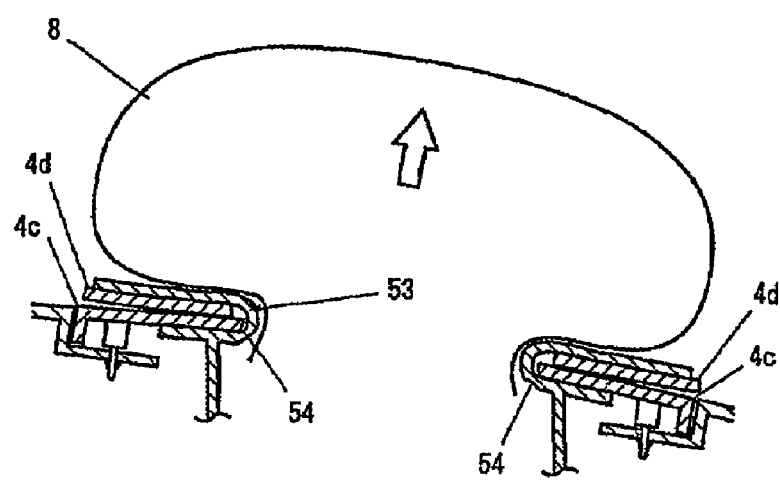
Figure 3:
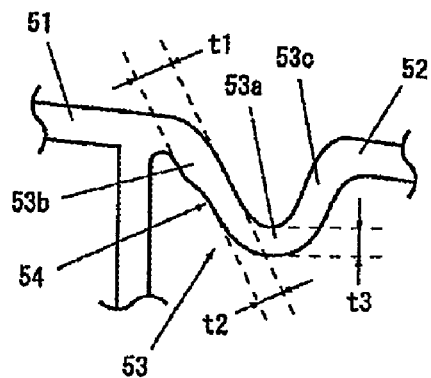
Figure 3:
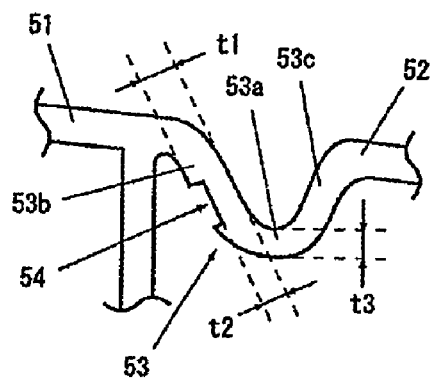
Figure 3:
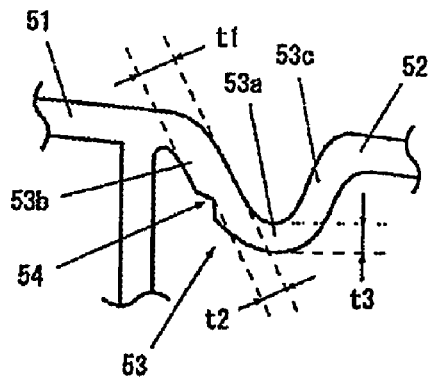
Figure 3:
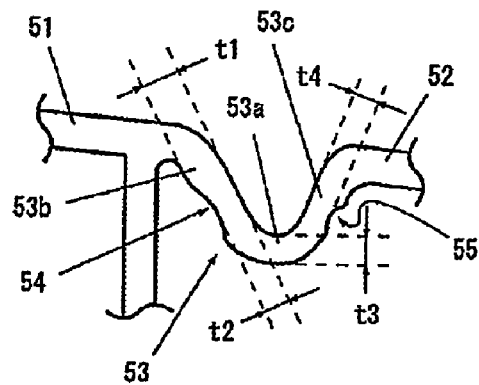
Figure 4:
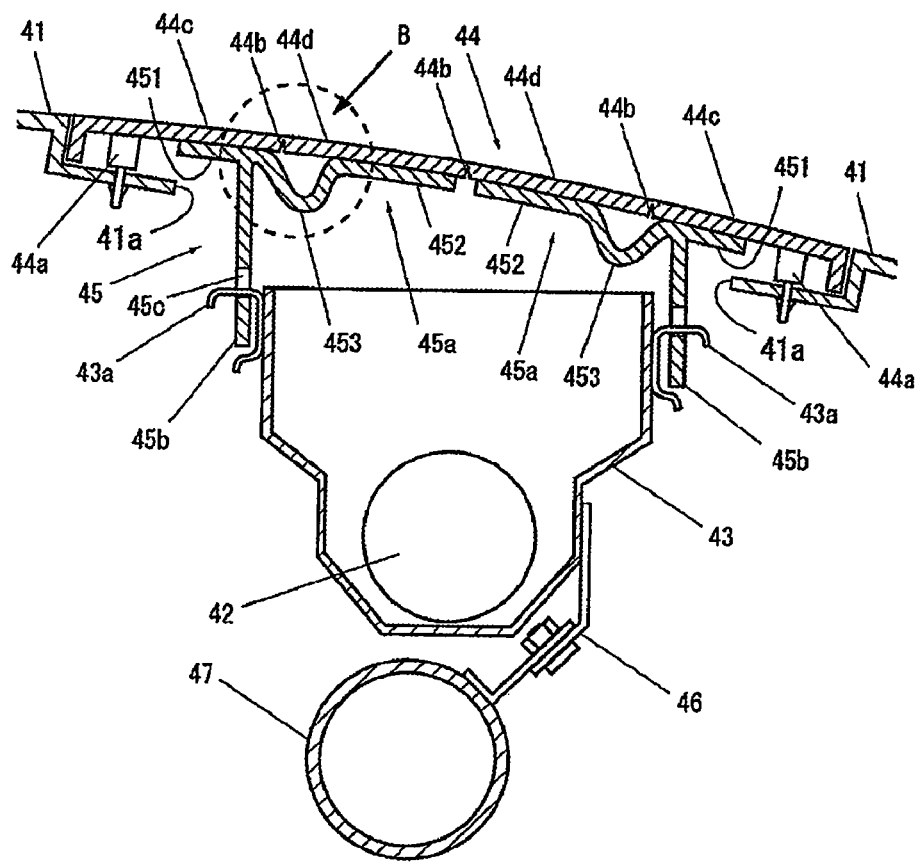
Figure 4:
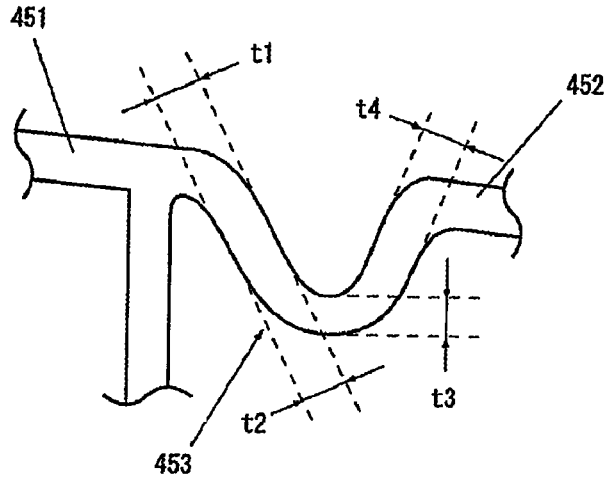

Hereinbelow, an embodiment of the present invention will be explained using FIG. 1(A) through FIG. 3(D). Currently, FIGS. 1(A) and 1(B) are views illustrating a passenger airbag apparatus, FIG. 1(A) is a cross-sectional view, and FIG. 1(B) is an enlarged view of B portion in FIG. 1(A).

The passenger airbag apparatus illustrated in FIGS. 1(A) and 1(B) is internally installed in a vehicle body side of an instrument panel 1 disposed at a front face of the passenger seat. Further, as illustrated in FIG. 1(A), the passenger airbag apparatus is provided with an airbag (not shown) that is folded back at a normal time and is expanded and extended in an emergency, an inflator 2 for supplying a gas into the airbag, a retainer 3 for housing the airbag and the inflator 2, an outer panel 4 mounted in the instrument panel 1, and an inner case 5 that is connected to an inside of the outer panel 4 and that latches the retainer 3. Further, the retainer 3 is coupled with a fixing member 7 via a joining member 6 and fixed thereto. Incidentally, the inflator 2 may be externally attached to the retainer 3 not being housed in the retainer 3.

In the aforementioned instrument panel 1, an opening portion 1a for use in releasing the airbag is formed in a substantially rectangular manner and is configured to be able to release the airbag. The outer panel 4 is mounted on the opening portion 1a with a plurality of clips 4a, and a surface thereof is processed so as to be assimilated to the instrument panel 1. Although a case in which the outer panel 4 and the instrument panel 1 are formed from separate members is explained here, the outer panel 4 may be integrally formed with the instrument panel 1. Furthermore, a plurality of notches 4b for allowing the outer panel 4 to easily crack at a time when the airbag is expanded is formed in an inside of the outer panel 4. The outer panel 4 is sectionalized into a pair of fixing portions 4c and 4c, and a pair of door portions 4d and 4d by means of the notches 4b. Incidentally, the notches 4b, 4b, and 4b at three places illustrated in FIG. 1(A) may be formed with a series of linear grooves.

The aforementioned inner case 5 is composed of an inner panel 5a connected to the inside of the outer panel 4 and a side wall 5b forming a space for housing the retainer 3. In order to connect the outer panel 4 and the inner panel 5a, various joining methods, such as a vibration welding, a supersonic welding, a volt fastening, a rivet fastening, an adhesive fastening, a heat swaging, or the like can be applied here. Moreover, a plurality of latching holes 5c is formed in the side wall 5b, and hooks 3a connected to the retainer 3 are configured to be latched thereto. Further, the inner panel 5a is divided into two parts at a center portion, and each inner panels 5a is composed of a supporting portion 51 connected to a fixing portion 4c of the outer panel 4, a flap portion 52 connected to a door portion 4d, and a hinge portion 53 formed between the supporting portion 51 and the flap portion 52. The hinge portion 53 is substantially U-shaped so as to have a convex shape toward a side of an opposite direction relative to an airbag releasing direction. Incidentally, an airbag-releasing portion structure is composed of the opening portion 1a, the outer panel 4, and the inner panel 5a.

The aforementioned hinge portion 53 is provided with a top portion 53a, a supporting portion side connecting portion 53b that connects the supporting portion 51 and the top portion 53a, and a flap side connecting portion 53c that connects the flap portion 52 and the top portion 53a as illustrated in FIG. 1(B), and a thin-walled portion 54 whose wall thickness is formed to be thinner than that of the other portion of the hinge portion 53 is provided at the supporting portion side connecting portion 53b. Further, the thin-walled portion 54 is smoothly connected to adjoining thick-walled portions. A stress concentration occurring in the hinge portion 53 can be eased by smoothly forming the thin-walled portion 54. Currently, when a thickness of the thick-walled portion of the supporting portion side connecting portion 53b is defined as t1, a thickness of the thin-walled portion 54 is defined as t2, a thickness of the top portion 53a is defined as t3, and a thickness of the flap side connecting portion 53c is defined as t4, the thickness t1, the thickness t3, and the thickness t4 are approximately the same thickness, and the thickness t2 of the thin-walled portion 54 is formed to be thinner than that of the other thicknesses t1, t3, and t4. However, in order to guarantee the rigidity required as a hinge of the hinge portion 53, the thickness t2 of the thinnest portion is preferable to have a thickness in an extent of 75 to 95% of the other thicknesses t1, t3, and t4, and is more preferable to have a thickness in an extent of 80 to 90% thereof. Incidentally, although the wall thickness is reduced by caving an inside of the supporting portion side connecting portion 53b (airbag side) in FIGS. 1(A) and 1(B), the wall thickness may be reduced by caving the opposite side (the side of the outer panel 4), or the wall thickness may be reduced by caving both sides. Furthermore, although the case in which the thickness t1, the thickness t3, and the thickness t4 are approximately the same thickness is illustrated, as long as the rigidity is guaranteed, these thicknesses t1, t3, and t4 are not necessary to be approximately the same thickness.

As described above, when the thin-walled portion 54 is formed at the supporting portion side connecting portion 53b of the hinge portion 53, the thin-walled portion 54 becomes a portion having a lower rigidity than the other portion of the hinge portion 53 (low rigidity portion). Hence, the thin-walled portion 54 becomes a starting point for rotating the hinge portion 53 when the airbag is released. That is, even when the rigidity of the supporting portion 51 for fixing and supporting the hinge portion 53, and that of the top portion 53a that is stretched at a time of the rotation of the hinge portion 53 are retained to be the required rigidity, the hinge portion 53 can be rotated at the thin-walled portion 54. Thereby, a shape of the hinge portion 53 can be designed to be small compared to the case with no thin-walled portion 54.

The aforementioned thin-walled portion 54 is absolutely an example of a low rigidity portion, and various configurations such as forming a plurality of punched holes, forming a plurality of small concavities and convexities, forming a plurality of notches on a surface, forming a plurality of slits in the supporting portion side connecting portion 53b, changing a material of the supporting portion side connecting portion 53b to that having low rigidity, or the like can be adopted other than the aforementioned.

Next, an operation of the passenger airbag apparatus illustrated in FIG. 1 when the airbag is expanded will be explained referring to FIGS. 2(A)-2(D). Here, FIGS. 2(A)-2(D) are views illustrating an operation of the passenger airbag apparatus illustrated in FIGS. 1(A) and 1(B) when the airbag is expanded, FIG. 2(A) illustrates an initial phase of expansion of the airbag, FIG. 2(B) illustrates a dividing phase of the outer panel, FIG. 2(C) illustrates a rotating phase of the door portion, and FIG. 2(D) illustrates a rotation completion phase of the door portion.

The initial phase of expansion of the airbag illustrated in FIG. 2(A) is a phase in which an airbag 8 expands in an inside of the inner case 5 and presses the inner panel 5a. In the airbag apparatus, when a predetermined signal is received from an ECU (Electronic Control Unit) that has sensed or detected a collision of a vehicle or the like, a gas is supplied from the inflator 2 to the airbag 8. The airbag 8 expands in a direction indicated by an arrow in the drawing, comes in contact with the inner panel 5a, and presses the same. Currently, in the present invention, since the hinge portion 53 can be small-sized, the hinge portion 53 causes less obstruction at the expansion phase of the airbag 8, and the airbag 8 can smoothly be released to the vehicle interior.

The dividing phase of the outer panel illustrated in FIG. 2(B) is a phase when the airbag 8 presses the outer panel 4, and divides the outer panel 4 into the fixing portions 4c and 4c, and the door portions 4d and 4d. Currently, a depth of the notch 4b and a thickness of the outer panel 4 are appropriately set so that the notch 4b between the door portion 4d and the door portion 4d becomes easy to be divided earlier than the notch 4b between the fixing portion 4c and the door portion 4d. Further, although the door portion 4d of the outer panel 4 is separated from the fixing portion 4c, there is no possibility that the door portion 4d is broken up because the inner panel 5a is connected to the inside thereof Incidentally, the fixing portion 4c is fixed to the instrument panel 1 with the clips 4a, and is configured not to be removed by the expansion of the airbag 8.

The rotating phase of the door portion illustrated in FIG. 2(C) is a phase when the door portion 4d is rotated toward the fixing portion 4c side around the hinge portion 53 as a center along with the proceeding of expansion of the airbag 8. Currently, although the hinge portion 53 is to be pressed up and stretched upward by the expansion of the airbag 8, the hinge portion 53 becomes easy to be rotated from the thin-walled portion 54 as a starting point because the thin-walled portion 54 is formed. Furthermore, although the top portion 53a of the hinge portion 53 becomes easiest to be stretched by being stretched by the rotation of the door portion 4d, the top portion 53a is formed to have a thickness capable of withstanding such tension force. That is, even when the wall thickness of the hinge portion 53 is increased so as to increase the rigidity thereof, a rotation starting point can be provided by forming the thin-walled portion 54 in the present invention. Thereby, a sufficient stretching amount of the door portion 4d can be secured. Hence, there is no necessity for enlarging the shape of the hinge portion 53 and the same can be small-sized.

The rotation completion phase of the door portion illustrated in FIG. 2(D) is a phase when the door portion 4d is folded back toward the fixing portion 4c side. Although the condition illustrated in FIG. 2(D) is not always realized depending on a shape of the airbag 8 or a situation of the vehicle interior, the hinge portion 53 is configured to function by existence of the thin-walled portion 54 formed in the hinge portion 53 even in a condition where the door portion 4d is thus completely folded back.

Next, other embodiments of the hinge portion will be explained. Here, FIGS. 3(A)-3(D) are views illustrating other embodiments of the hinge portion, in which FIG. 3(A) illustrates a second embodiment, FIG. 3(B) illustrates a third embodiment, FIG. 3(C) illustrates a fourth embodiment, and FIG. 3(D) illustrates a fifth embodiment.

In the second embodiment illustrated in FIG. 3(A), the thin-walled portion 54 is formed such that a wall thickness of the supporting portion side connecting portion 53b is formed to be gradually thinner from the thickness t1 of the supporting portion 51 side, and when the wall thickness reaches a predetermined thickness t2, the same is smoothly connected to the top portion 53a having the thickness t3 that is approximately the same as the thickness t1. Further, in the third embodiment illustrated in FIG. 3(B), the thin-walled portion 54 is formed to have a groove shape. Furthermore, in the fourth embodiment illustrated in FIG. 3(C), the thin-walled portion 54 is constructed with two slanting surfaces. As illustrated in these embodiments, various shapes can be adopted into the thin-walled portion 54.

Moreover, in the fifth embodiment illustrated in FIG. 3(D), a thin-walled portion 55 having low rigidity is formed also in the flap side connecting portion 53c. For example, the thickness t1 and the thickness t3 are formed to be approximately the same thickness, the thickness t2 and the thickness t4 are formed to be approximately the same thickness, and the thicknesses t2 and t4 are formed to be thinner than the thicknesses t1 and t3. Thus, the number of the rotation starting points of the hinge portion 53 can be increased by forming the thin-walled portion 55 also in the flap side connecting portion 53c in addition to the supporting portion side connecting portion 53b, and thereby the hinge portion 53 can be aimed at small-sizing. Incidentally, although the case where the thickness t2 and the thickness t4 are thinned to be approximately the same thickness is explained here, the rate for thinning the thickness t2 and the thickness t4 may be designed to be different. Further, as long as the rigidity is guaranteed, the thickness t1 and the thickness t3 are also not necessary to be approximately the same thickness.

The aforementioned thin-walled portion 55 is also absolutely an example of a low rigidity portion, and various configurations such as forming a plurality of punched holes, forming a plurality of small concavities and convexities, forming a plurality of notches on a surface, forming a plurality of slits in the flap side connecting portion 53c, changing a material of the flap side connecting portion 53c to that having low rigidity, or the like can be adopted other than the aforementioned. Furthermore, as for the shape of the thin-walled portion 55, various shapes such as that illustrated in FIGS. 3(A) through 3(C) can be adopted similarly to the thin-walled portion 54.

Although the above-described embodiments are explained on the basis of a passenger airbag apparatus, the present invention is not limited to the passenger airbag apparatus, and the present invention can be applied to an airbag apparatus installed in any portion, as long as the airbag-releasing portion structure is provided with an opening portion for use in releasing an airbag formed in a vehicle structure, an outer panel covering the opening portion, and an inner panel connected to an inside of the outer panel, in which the outer panel includes a door portion for opening the aforementioned opening portion at a time when the airbag is expanded and a fixing portion connected to the vehicle structure, and which the inner panel includes a flap portion connected to the door portion, a supporting portion connected to the fixing portion, and a hinge portion that is substantially U-shaped, formed between the flap portion and the supporting portion.

Moreover, the present invention is not limited to the above-described embodiments and it will be understood by those skilled in the art that various changes may be made without departing from the spirit and scope of the present invention and it is applicable that, for example, the number of the door portion and that of the hinge portion may be singular number or more than two, the vehicle structure may be a door portion, a ceiling portion, a steering portion, or the like other than the instrument panel, and so forth.

What is claimed is:

1. An airbag apparatus comprising:
   an airbag;
   a cover extending over the airbag and having a plurality of frangible portions that are configured to be broken upon airbag deployment so that a door portion of the cover is broken away and released from an adjacent fixed portion of the cover and is pivoted relative thereto;
   an inner panel secured to the cover thereunder including a support portion connected to the cover fixed portion, a flap portion connected to the cover door portion, and an arcuate hinge portion extending between the support portion and flap portion with the hinge portion being spaced from the cover prior to airbag deployment and subject to tension forces stretching the hinge portion during airbag deployment and pivoting of the cover door portion;
   a curved peak portion of the hinge portion that is stretched as the cover door portion pivots upon airbag deployment; and
   a pivot portion of the hinge portion between the curved peak portion and the support portion with the pivot portion configured to be of lower rigidity than the curved peak portion so that the pivoting of the hinge portion is initiated at the pivot portion and the greater rigidity of the curved peak portion allows the curved peak portion to withstand tension forces applied thereto and stretching thereof as the cover door portion is pivoted.

2. The airbag apparatus of claim 1, wherein the hinge portion includes another pivot portion that is between the curved peak portion and the flap portion and which is configured to be of lower rigidity than the curved peak portion to allow pivoting of the hinge portion to be initiated at both pivot portions thereof.

3. The airbag apparatus of claim 1, wherein the pivot portion is thinner than the curved peak portion.

4. The airbag apparatus of claim 1, wherein the pivot portion has a wall thickness that is in the range of 75% to 95% of a wall thickness of the curved peak portion.

5. The airbag apparatus of claim 1, wherein the pivot portion is thinner than the remainder of the hinge portion.

6. The airbag apparatus of claim 1, wherein the pivot portion has a wall thickness that is in the range of 75% to 95% of a wall thickness of the remainder of the hinge portion.

7. The airbag apparatus of claim 1, wherein the pivot portion comprises a notch in the hinge portion.

8. The airbag apparatus of claim 7, wherein the notch has a groove configuration with a recessed bottom surface and side surfaces on either side of the bottom surface.

9. The airbag apparatus of claim 7 wherein the notch has a pair of oblique surfaces that meet at a recessed point in the hinge portion.

10. A cover device for an airbag, the cover device comprising:
    an airbag;
    an outer cover panel;
    a center frangible portion and side frangible portions extending alongside the center frangible portion;
    a pair of door portions of the outer cover panel with one door portion extending laterally between one of the side frangible portions and the center frangible portion and the other door portion extending laterally between the other of the side frangible portions and the center frangible portion with the frangible portions configured so that the center frangible portion is broken upon airbag deployment prior to the side frangible portions;
    a pair of fixed portions of the outer cover panel extending from the respective side frangible portions laterally away therefrom;
    a pair of inner panels each connected to and extending along the respective door portions and fixed portions of the outer cover panel to keep the door portions secured thereto with the frangible portions broken by airbag deployment;
    an arcuate hinge portion of each of the inner panels generally aligned with a corresponding side frangible portion of the outer cover panel and extending downwardly therefrom to allow the door portions be pivoted toward the corresponding fixed portions of the outer cover panel;
    a lowermost curved wall section of each of the arcuate hinge portions that is adapted to curve around an exposed edge of the corresponding fixed portion at the associated side frangible portion upon pivoting of the door portions toward the fixed portions, the lowermost curved wall sections having a predetermined wall thickness sized to provide sufficient rigidity to the curved wall section to take tension forces applied thereto and stretching thereof with airbag deployment and pivoting of the door portions toward the corresponding fixed portions;
    a depending wall section of each of the arcuate hinge portions extending from the corresponding outer cover panel fixed portion down to the lowermost curved wall section; and
    a pivot portion of each of the depending wall sections having a predetermined wall thickness that is less than the predetermined wall thickness of the lowermost curved wall section for causing pivoting of the hinge portions to initially occur at the respective pivot portions thereof and to allow the hinge portions including the thicker lowermost curved sections thereof to be minimized in size to avoid interfering with deployment of the airbag.

11. The cover device of claim 10, wherein the hinge portions each include another depending wall section extending from the corresponding door portion down to the lowermost curved wall section and having a pivot portion with a predetermined wall thickness less than the predetermined wall thickness of the lowermost curved wall section.

12. The cover device of claim 10, wherein the depending wall sections each include a wall portion extending between the corresponding outer cover panel fixed portion and the pivot portion and having a predetermined wall thickness that is greater than the predetermined wall thickness of the pivot portion.

13. The cover device of claim 12, wherein the predetermined wall thickness of the wall portions are substantially the same as the predetermined wall thickness of the lowermost curved sections.

14. The cover device of claim 12, wherein each of the wall portions and corresponding pivot portions have a transition portion therebetween where the thicker wall portions gradually thin to the thinner pivot portions.

15. The cover device of claim 14, wherein each of pivot portions are smoothly connected to the thicker, corresponding lowermost curved section.

16. The cover device of claim 12, wherein each of the thin pivot portions are smoothly connected to the thicker, corresponding wall portion and the thicker, corresponding lowermost curved section to reduce stress concentration in the hinge portions.

17. The cover device of claim 10, wherein each of the pivot portions comprise a notch in the corresponding depending wall section.

18. The cover device of claim 17, wherein the notch has one of a rectangular and a triangular cross-sectional configuration.

19. The cover device of claim 10, wherein the predetermined wall thickness of the pivot portions is in the range of 75% to 95% of the predetermined wall thickness of the thicker, lowermost curved sections.

* * * * *